July 21, 1970     E. H. HOLLAND     3,521,384

SPACE MOTION SIMULATOR SYSTEM

Filed April 22, 1966     8 Sheets-Sheet 4

INVENTOR
ELDIE H. HOLLAND

BY

ATTORNEYS

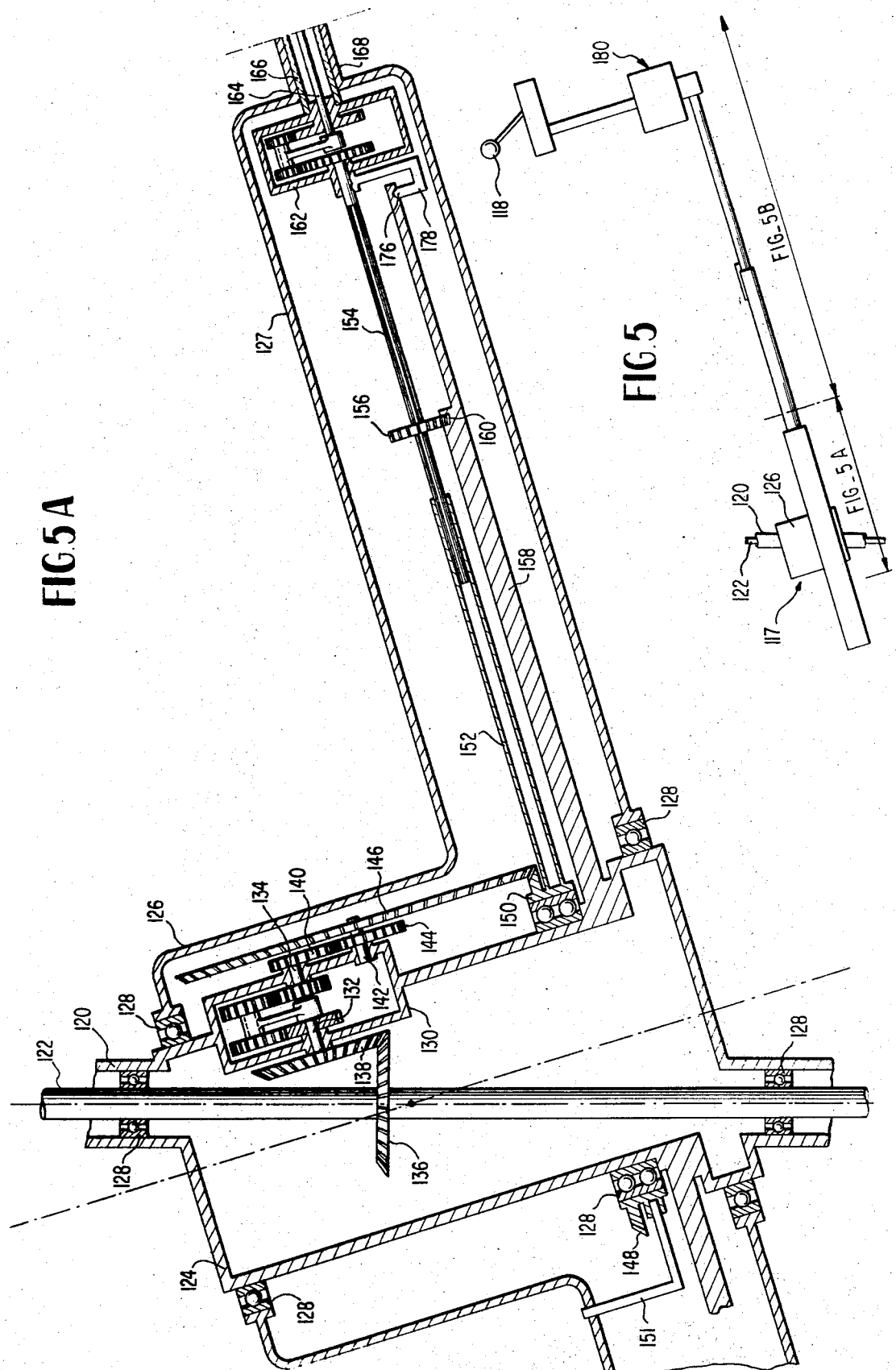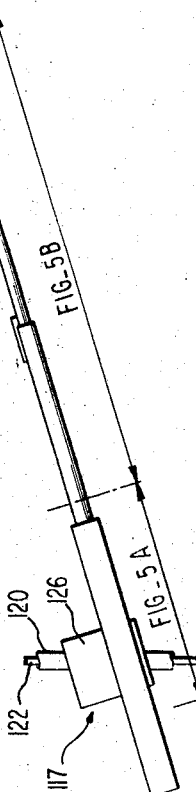

July 21, 1970 E. H. HOLLAND 3,521,384
SPACE MOTION SIMULATOR SYSTEM
Filed April 22, 1966 8 Sheets-Sheet 6
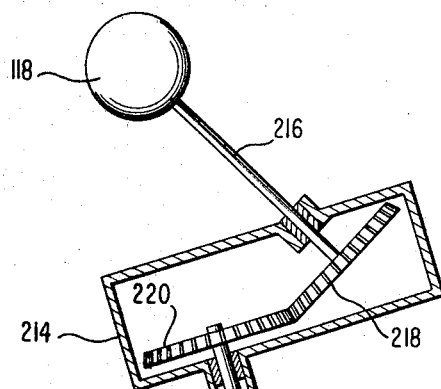
FIG. 5 B
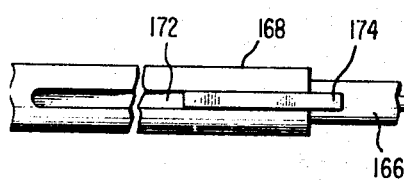
FIG. 6
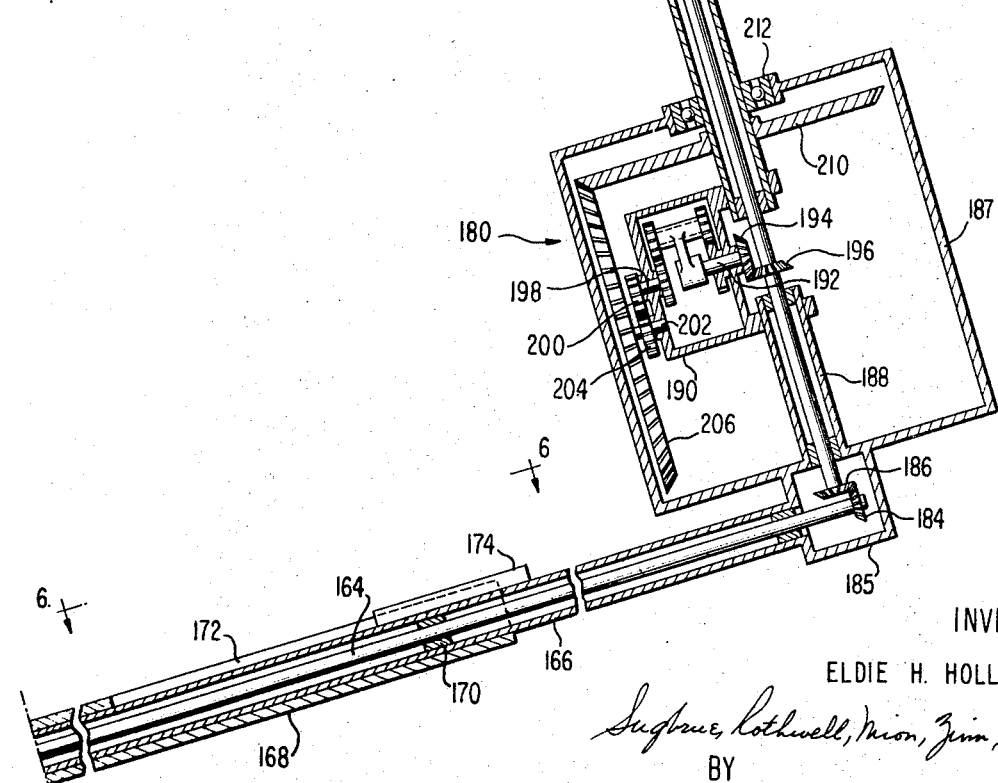
INVENTOR
ELDIE H. HOLLAND July 21, 1970  E. H. HOLLAND  3,521,384
SPACE MOTION SIMULATOR SYSTEM
Filed April 22, 1966  8 Sheets-Sheet 7
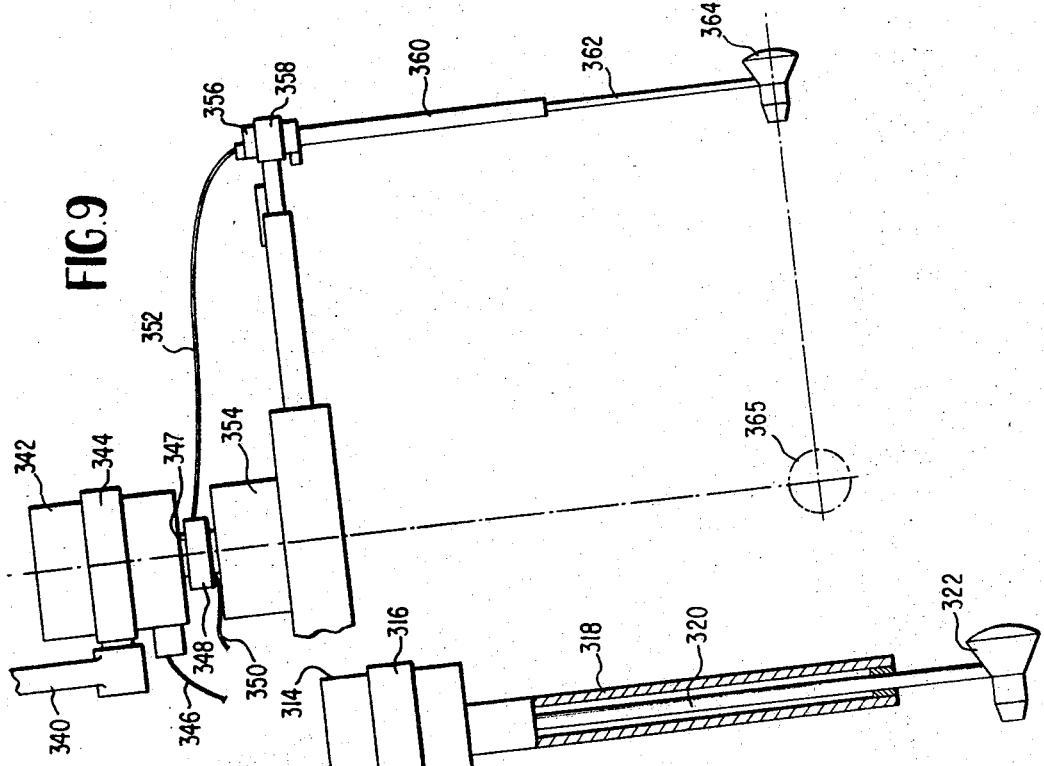
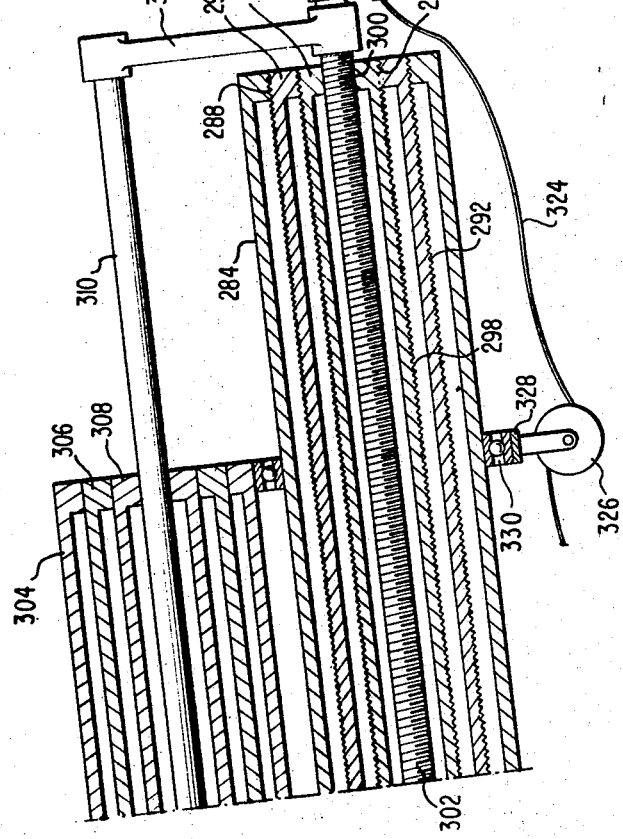
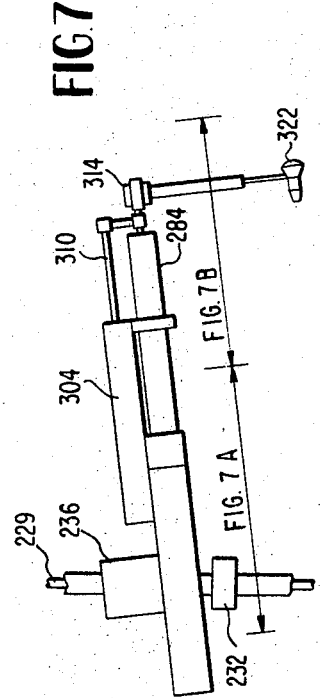

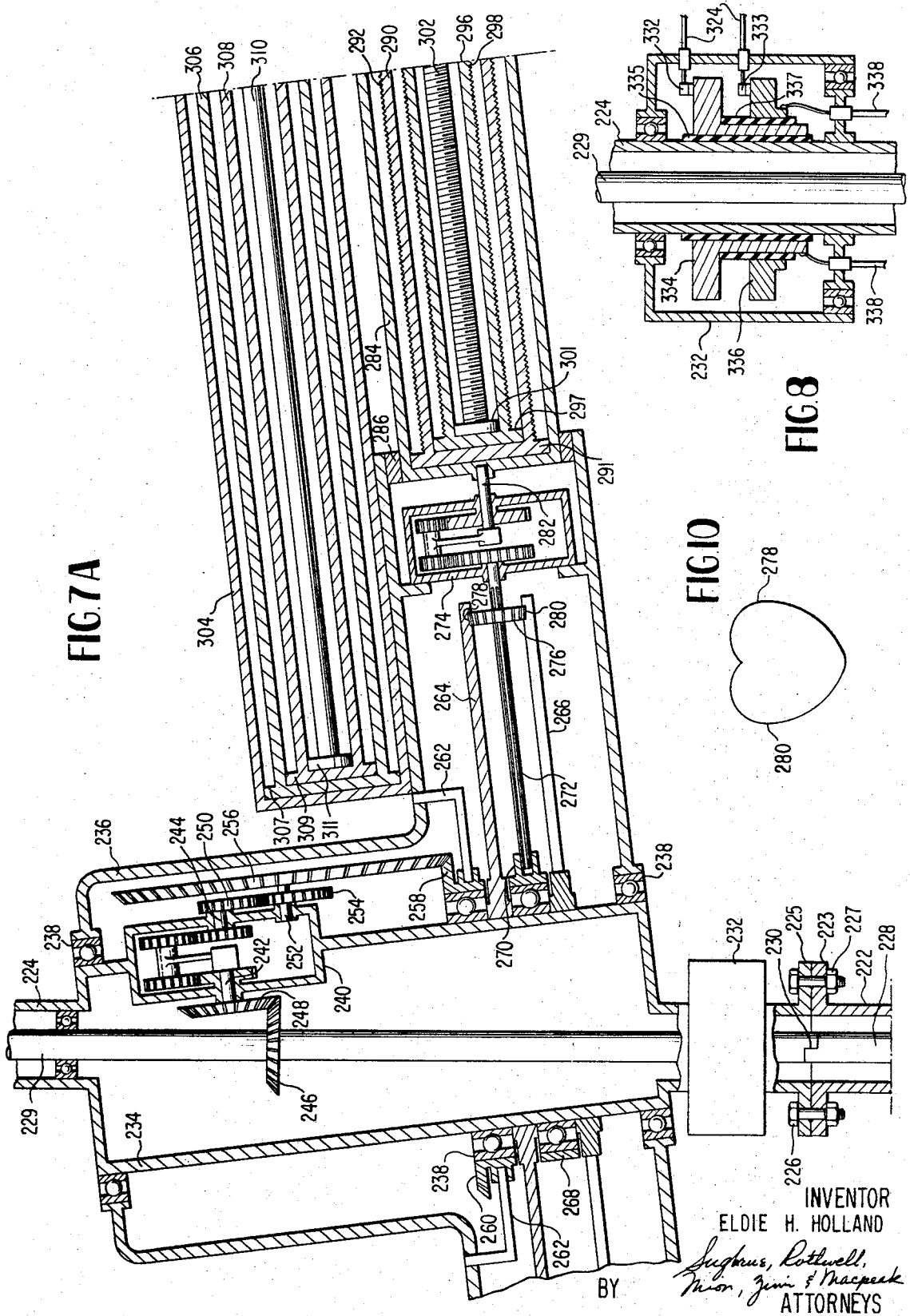

United States Patent Office 3,521,384
Patented July 21, 1970

3,521,384
SPACE MOTION SIMULATOR SYSTEM
Eldie H. Holland, Box 747, Athens, Ala. 35611
Filed Apr. 22, 1966, Ser. No. 544,509
Int. Cl. G09b 27/02
U.S. Cl. 35—45
11 Claims

ABSTRACT OF THE DISCLOSURE

A space motion simulator system wherein a plurality of model planets and/or spaceships are arranged to travel in their correct elliptical paths about the sun in the case of the planets of our solar system or along their correct interplanetary paths in the case of spaceships as a function of time so as to enable future predictions of the positions of said planets and/or spaceships with respect to each other and the sun.

---

The exploration of space requires the application of every discipline of knowledge known to mankind. Consequently, there are serious needs for a universal information system, or machine, that will serve as a problem solving instrument for the scientist, engineer, and technician charged with solving the many interdisciplinary problems and creating the materials and hardware required to explore space. Also, the universal information system must serve as an orientation and decision making tool to assist administrators and all other levels of management in arriving at the most logical decisions when committing appreciable portions of a nation's resources to space exploration. Further, the universal information system must be available to the news media and other groups charged with the responsibility of keeping the lay public informed of how their tax dollars are being spent in the various space programs. Finally, the universal information system must serve teachers and students in colleges, universities, and high schools to train, motivate, and inspire succeeding generations to continue mankind's conquest of space.

The simulator of the present invention is a precision, twenty-year three dimensional simulator system which displays as a function of time an earth-orbit space flight mission, an earth-moon space flight mission, an interplanetary space flight mission and the orbital and axial motions of the nine planets of the solar system as they move around the sun's center in their correctly oriented elliptical orbits at the proper velocities and equatorial orientations. The present system is portable and consists of a single main assembly which is capable of simulating any of the above listed arrangements by means of a simple interchange of parts within the main assembly. Also subsystem interchangeability within each arrangement can be accomplished. The system can be updated to incorporate new knowledge of the planets and natural satellites and to simulate various space flight missions.

The system is expected to become one of the basic instruments used by groups within government, private industry, colleges and universities, and high schools engaged in research, development, design, and teaching in the fields of astronomy and astronautics. It is significant that the system is a labor saving device which actually solves problems in astronomy and astronautics, especially celestial and spaceflight mechanics. The non-specialist, including the hardware designer, can use the machine to quickly generate highly specialized data which is normally supplied by those highly trained in the various specialized fields within astronomy and astronautics. Therefore, additional economy can be realized in our space exploration programs.

The system will also serve as an excellent management, news media, and layman briefing tool for demonstrating current and proposed space exploration programs.

In addition to the various planets, satellites, and spacecrafts and the means for driving these elements in their proper timed relation with respect to each other, the present invention is also directed to the instrumentation necessary for obtaining data from the system such as the distance from the sun's center to the spacecraft or planet's center, heliocentric orbital longitude, heliocentric orbital velocity, the intersection of the orbital plane of the planet or spacecraft with the orbital plane of the earth, the points of nearest and farthest distances of the spacecraft or planet's center from the sun's center, the position of the vernal equinox, the argument of perihelion, and the longitude of perihelion. To obtain such data, scales are provided on the oblate spheroid which coincide with the orbital plane of each respective planet or spacecraft. The scales can be permanent or removable and navigation star positions can be plotted on the spheroid in correct relationship to the sun's center, planets, and spacecraft. The various instrumentation necessary for obtaining the desired data is all mounted on a swivelled instrument rack which is mounted symmetrical to the support stand and oblate spheroid and capable of swivelling 360 degrees thereabout. The rack is provided with a curved portion which has its center of radius at the sun's center. The instrumentation includes an optical viewing and scale reading unit which is mounted for movement on the curved portion of rack along with a heliocentric ecliptic latitude meter which automatically computes and displays the number of degrees, minutes, and seconds of arc the viewed object is above or below the earth's orbital plane. The optical viewing and scale reading unit and the heliocentric ecliptic latitude meter are simultaneously positioned by means of a hand wheel such that when the viewing unit is correctly positioned on an object, the heliocentric ecliptic latitude is automatically computed and displayed on the latitude meter. The swivelled rack is also provided with heliocentric ecliptic longitude meter which automatically computes and displays the number of degrees, minutes, and seconds of arc the optical viewing and scale reading unit is located from the vernal equinox. The angle is measured in the earth's orbital plane and is computed as the instrument frame is rotated about the support stand to correctly position the optical viewing and scale reading unit. Also mounted on the instrument rack is a drive motor programmer which programs the running time of the system drive motor which drives the arrangements located inside the transparent oblate spheroid. The programmer can be set to drive the arrangements to any desired time period or position within a twenty-year range. A twenty-year time resolver is also mounted on the instrument rack and computes and displays universal and ephemeris time as each arrangement is driven through its motions inside the transparent oblate spheroid. Universal time is displayed in years, months, days, hours, minutes, and seconds. Ephemeris time is displayed in Julian day numbers in increments to the fifth or sixth decimal place. Sidereal time can also be displayed, if desired.

The present invention is directed to a space motion simulator system which may be arranged to provide a heliocentric-geocentric earth-orbit space flight simulator arrangement which will give the sun's center, earth-spacecraft motions, positions, distances, and velocities all as a function of time for any earth-orbit space flight mission considered during the twenty-year period.

The earth model will revolve around the sun's center in its correctly oriented elliptical orbit and at the proper velocities, and it will rotate about its polar axis at the proper rate and equatorial orientation. The earth model will be marked off in parallel lines of geocentric longitude and latitude to show the earth's proper surface orientation at all times. Also, a line which coincides with the earth's orbital plane about the sun is included on the earth model to permit proper cross-hair alignment of the optical viewing and scale reading unit with the orbit scales on the transparent oblate spheroid. In addition, surface detail and coloring is included on the earth model.

The launch site and tracking and communication stations can be correctly plotted on the earth model to show the time and position of earth at launch and to show when each tracking and communication station can be in contact with the orbiting spacecraft. Also, other areas of interest can be properly identified on the earth model to show the time and position at which the spacecraft can monitor or survey the earth area in question.

The spacecraft model will be shown revolving around the earth model in its properly oriented circular or elliptical orbit. It will travel at the proper velocity or velocities and will be at the correct position and distance from earth at all times during the earth-orbit mission. For some deep space earth-orbit missions, it is technically possible to show the spacecraft model leaving the launch site and being maneuvered into its prescribed orbit and the spacecraft will be time synchronized in its prescribed orbit and maintain the correct time-position-distance-velocity relationship during the mission.

The spacecraft model can have motion about its center of mass to provide equal exposure time of the spacecraft's surface to the sun's rays and to create artificial gravity, if the spacecraft is manned.

The spacecraft could be a manned orbiting laboratory, an assembly space station, or an unmanned scientific satellite. Also, more than one spacecraft can be included in the arrangement, if desired. If the spacecrafts follow different orbits, separate spacecraft drive units must be included; however, if they have identical oribits but are separated by some known angle, the same drive unit will drive the spacecrafts. An example would be six synchronous communications satellites spaced 60 degrees apart.

The heliocentric-geocentric-earth-orbit space flight simulator arrangement can be used to demonstrate past, present, and future manned and unmanned earth-orbit space flight missions consisting of one or more spacecrafts. Past missions can be repeatedly simulated to assist in the analysis and evaluation of data collected during the mission and thus help determine if follow-up missions are required. Present missions which are already in flight can be simulated to demonstrate the mission's progress to all concerned and to show simultaneously the motions, positions, distances, and velocities of the earth and spacecraft as the earth revolves about the sun and rotates about its polar axis while the spacecraft orbits the earth. This will assist in the analysis and evaluation of data collected and processed during the mission. With respect to future missions, during the study and analysis phases of defining the earth-orbit mission objectives, the earth and/or space areas to be monitored or surveyed can be identified and studied in determining the surface and flight instrumentation and other experimental equipment required to achieve the mission objectives.

All earth-orbits of interest can be simulated on the machine to assist in determining the following surface and flight systems requirements:

(1) Mission period
(2) Launch window
(3) Propulsion, including guidance and control (for the launch vehicle and orbit control)
(4) Navigation
(5) Surface and flight system communications and tracking
(6) Spacecraft shielding for protection against solar and Van Allen radiation and meteroid hazards, as applicable
(7) Life support (for manned missions)
(8) Landing site and alternate locations (if the spacecraft is to be landed)
(9) Recovery systems and their deployment (if the spacecraft is to be landed).

Once the proposed mission objectives and requirements have been established, the simulator will be used to demonstrate the mission to top management and other interested groups during the course of obtaining funding approval and mission go-ahead. After mission approval, the simulator will continue to serve as an excellent orientation tool to demonstrate the mission to all levels of management, technical and administrative groups, the news media, and laymen to assure that all have a clear understanding of the mission objectives, requirements, and progress during all phases of the mission.

It is significant to add that during the research, development, and design phases of the program, the simulator will be utilized, especially by the hardware designer and technician, to quickly generate very specialized data which must otherwise be supplied by those highly trained in the various specialities withing astronomy and astronautics, especially celestial and space flight mechanics. Therefore, the machine is a labor saving device and will inject additional economy into our earth-orbit space flight programs.

The simulator will be useful to the mathematics, physics, astronomy, and engineering departments within colleges and universities to:

(1) Actually solve problems in earth astronomy and astronautics, especially celestial and earth-orbit space flight mechanics,
(2) Demonstrate the simultaneous heliocentric and geocentric motions of the earth and spacecraft
(3) Demonstrate the surface and flight system requirements for manned and unmanned earth-orbit space flight operations.

The present invention is also directed to a system which may be arranged as a heliocentric-geocentric earth-moon space flight simulator arrangement which will give the sun's center-earth-spacecraft-moon positions, motions, distances, and velocities all as a function of time for any earth-moon space flight mission considered during a twenty-year period.

The launch site and world-wide tracking and communication stations can be correctly plotted on the earth model to show the time and position of earth at launch and to show when each tracking and communication station can be in contact with the spacecraft and moon. For manned round-trip missions, the primary and alternate landing sites can be plotted on the earth model to show their positions at all times during the mission.

The moon model will travel around the earth model in its correctly oriented elliptical orbit and at the proper velocities. Also, the moon model will maintain its proper surface and equatorial orientation. The moon model will be marked off in parallel lines of selenocentric longitude and latitude to show the proper lunar surface orientation at all times during the earth-moon space flight mission. Further, surface detail and coloring is included on the moon model.

The fly-by area, or impact point, or spacecraft orbital plane and area to be surveyed, or the landing and launch sites can be correctly plotted on the moon model to show their positions during the mission.

The earth-moon spacecraft model will be shown leaving the earth and travelling through space along its prescribed flight trajectory to the moon. Upon arrival at the moon, the spacecraft will fly-by, impact, orbit, or land on the moon in accordance with the mission plan. If the mission is round-trip, the spacecraft will depart from the moon at the proper time and return to the earth along its planned flight path. Upon arrival in the earth's vicinity, the spacecraft will go into an earth-orbit, land, or fly-by; whichever the mission dictates. During flight, the spacecraft can have motion about its center of mass to provide equal exposure time of the spacecraft's surface to the sun's rays and to provide artificial gravity for crew members, if the spacecraft is manned.

Therefore, the heliocentric-geocentric earth-moon space flight simulator arrangement is capable of simulating a lunar mission in three dimension while simultaneously displaying all pertinent space flight data as a function of time. As with the earth-orbit space flight simulator the earth-moon space flight simulator can be utilized to simulate past, present and future missions especially to determine numerous surface and flight system requirements similar to those set forth above with respect to the earth-orbit simulator.

The space motion simulator system of the present invention is also capable of being used as a heliocentric-planetocentric interplanetary space flight simulator arrangement which will give the sun's center-departure planet-spacecraft-target planet motions, positions, distances, and velocities all as a function of time for any interplanetary space flight mission considered during a twenty-year period. In such an arrangement, the planet models are driven about the sun's center in their correctly oriented elliptical orbits and at the proper velocities. Each planet model will rotate about its polar axis at the proper rate and equatorial orientation. The planet models are marked off in parallel lines of planetocentric longitude and latitude to show their proper surface orientation at all times during the space flight mission. Also, a line which coincides with the orbit plane of each planet about the sun's center is included on the respective model. Surface detail and coloring are shown on the planet models.

The launch station and world-wide tracking and communication stations can be correctly plotted on the earth model to show the time and position of earth at launch and to show when each tracking and communication station can be in contact with the interplanetary spacecraft and the target planet. For round-trip missions, the primary and alternate landing sites can be correctly plotted on the earth model and thus display their locations at all times during the mission.

The fly-by area, or impact point, or orbital plane, or landing and launch sites can be correctly plotted on the target planet model to show their positions during the mission. The spacecraft will follow its predetermined interplanetary space flight trajectory and can have motions about its center of mass to permit equal exposure time of the spacecraft's surface to the sun's rays and to provide artificial gravity for crew members, if the spacecraft is manned. The spacecraft will be shown leaving the earth and travelling through space along its prescribed trajectory. On arrival at the host planet, the spacecraft will fly-by, impact, orbit, or land on the planet; depending upon the dictates of the mission. If the mission is round-trip the spacecraft will depart at the proper time and return home to earth where it will fly-by, go into earth orbit, or land, as the mission requires. In such a system the spacecraft can be removed to allow the planets to be studied separately, if desired, just as one or more of a planet's natural satellites can be included in the arrangement. The same applies to the aforementioned earth-orbital and earth-lunar arrangements. It is also technically feasible to simulate an interplanetary space flight mission which includes more than one host planet, that is, the spacecraft drive unit will include orbit plane changing maneuvers. As with the previous arrangements, it is possible to simulate a space flight mission in three dimension while simultaneously displaying all pertinent space flight data as a function of time.

As with the two previous space flight simulator arrangements the interplanetary flight simulator can be utilized to simulate past, present and future missions especially to determine numerous surface and flight requirements similar to those set forth with respect to the earth-orbit simulator.

Another arrangement which may be displayed on the space motion simulator system of the present invention is a solar system heliocentric-planetocentric motion simulator arrangement. Such an arrangement gives the simultaneous motions, positions, distances, and velocities all as a function of time for each one of the nine planets during a twenty-year period. The planets are driven about the sun's center in their correctly oriented elliptical orbits and at proper velocities. In addition, the planets rotate about their polar axes at the proper rates and correct equatorial orientations. Each planet model is marked off in parallel lines of planetocentric longitude and latitude to show the planet's proper surface orientation at any time. Also, a line is included on each planet model which coincides with the planet's orbit plane about the sun's center. Surface detail and coloring is included, consistent with each planet model size and current knowledge of the planets. Furthermore, the correct surface to surface distances between adjacent planets is maintained. The planets natural satellites can be included in the arrangement and their motions simulated. The solar system simulator is a labor saving device because it computes and displays very specialized planetary data which must otherwise be computed by those highly trained in astronomy, especially celestial mechanics. This is significant in the field of astronautics because the machine shows the planets in motion and simultaneously makes planetary data available to the non-specialist in astronomy for use in the study and implementation of manned and unmanned space flight missions. For example, a spacecraft unit may be included in the arrangement to simulate the mission of an interplanetary astronomical observatory.

The solar system simulator can be utilized to plan and implement ground based optical, radio, and radar deep space observation programs. The position of each observing station can be correctly plotted on the earth model to show when each station can observe a particular planet or sky area. This will be especially helpful in planning and coordinating the activities of the various observing stations participating in national and international cooperative astronomy and astronautics programs. The planet models are always shown in their correct positions and moving at their proper velocities, so that the simulator will be useful in setting up perturbation equations required in the computation of planetary ephemerides.

Therefore, the space flight simulator system of the present invention provides a compact portable unit which may drive a plurality of interchangeable planets, satellites, and spacecrafts to their proper paths with respect to each other and to the sun's center.

Other features of the invention will be pointed out in the following description and claims and illustrated in the accompanying drawings, which disclose, by way of example, the principles of the invention and the best mode which has been contemplated of applying those principles.

In the drawings:

FIG. 1 is a perspective view of the simulator system arranged as a heliocentric-geocentric earth-orbit space flight simulator, FIG. 1a is partial sectional view showing the fine adjustment means, FIG. 1b is a detailed view of the vertical drive on the instrument rack, FIG. 2 is a perspective view of the simulator system arranged as a heliocentric-geocentric earth-moon space flight simulator, FIG. 3 shows a perspective view of the simulator system arranged as a heliocentric-planetocentric interplanetary space flight simulator, FIG. 4 is a perspective view of the simulator system arranged as a solar system heliocentric-planetocentric motion simulator, FIG. 5 is a schematic view of a typical elliptical or circular orbit drive unit, FIG. 5a is a partial sectional view of the left hand end of the mechanism shown in FIG. 5 and indicated therein by the legend, "FIG. 5a,"

FIG. 5b is a partial sectional view of the right hand end of FIG. 5 indicated therein by legend, "FIG. 5b,"

FIG. 6 is a detailed plane view of the spline shaft connection shown in FIG. 5b, FIG. 7 is a schematic view of the spacecraft telescoping drive unit, FIG. 7a is a partial sectional view of the left hand side of the mechanism shown in FIG. 7 and designated therein by the legend, "7a,"

FIG. 7b is a partial sectional view of the right hand side of FIG. 7 and designated therein by the legend, "FIG. 7b,"

FIG. 8 is a partial sectional view of the slip ring construction shown in FIG. 7a, FIG. 9 is a side elevational view of a spacecraft orbiting drive unit adapted to be used in conjunction with a spacecraft telescoping drive unit, and FIG. 10 shows a schematic view of the gear track path on the split gear.

Figure 1:
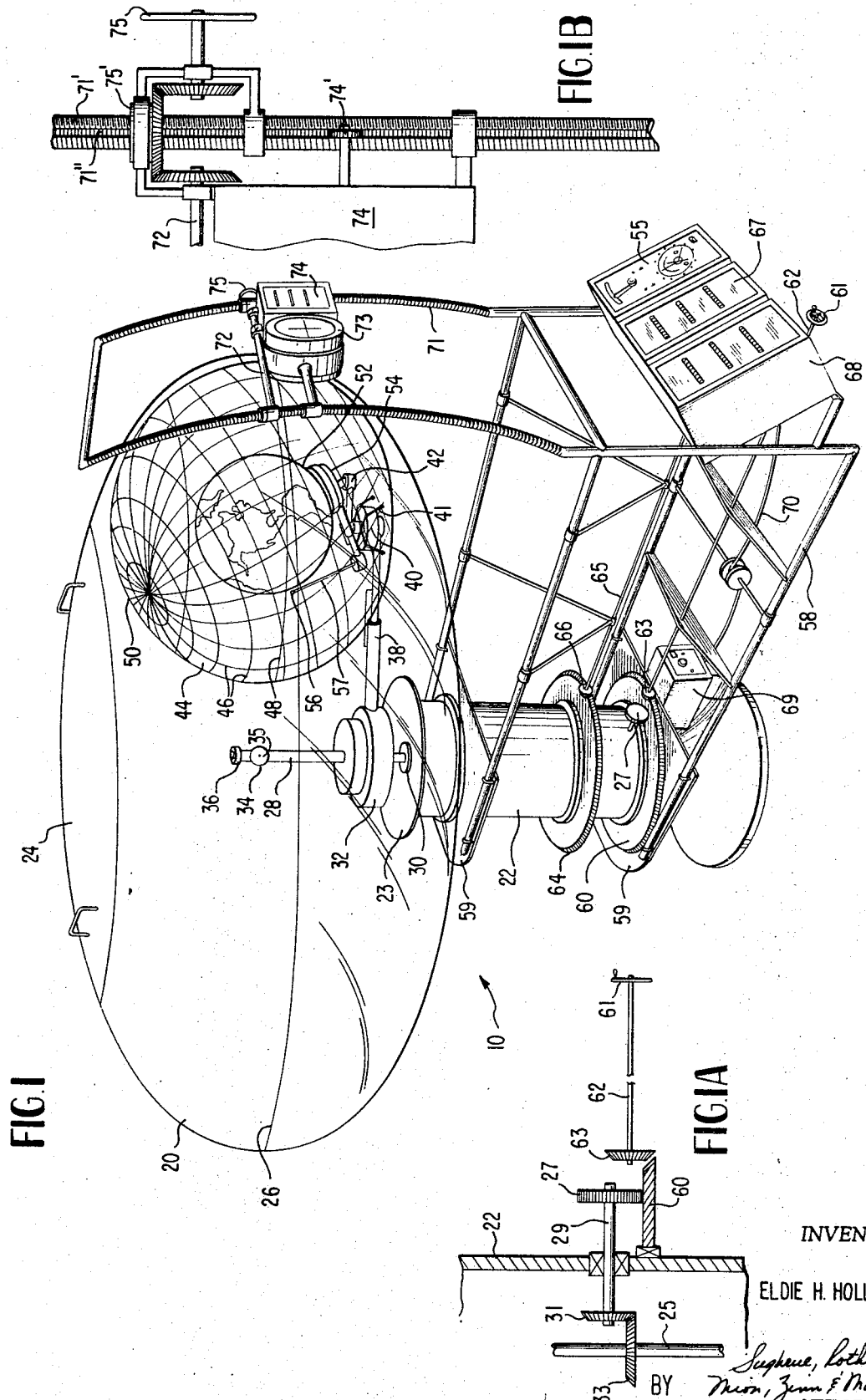

Referring now to FIG. 1, the numeral 10 designates in general the space motion simulator system of the present invention. The particular arrangement employed within the transparent oblate spheroid 20 in FIG. 1, is that of a heliocentric-geocentric earth-orbit space flight simulator. The transparent oblate spheroid 20 is mounted symmetrical to the sun's center which is indicated by the dot 35 and encloses the internal arrangements as shown in FIGS. 1–4. The spheroid 20 is mounted upon the support plate 23 attached to support stand 22 which houses the system drive motor and central drive shaft 25 which provides angular input to the servo box 69 and drives the arrangement shown inside the oblate spheroid. The support stand also serves as a mounting column for the swivelled instrument rack, instrument gears and servo box. The spheroid 20 is provided with an access dome 24 which may be removed to enable the arrangements within the spheroid to be changed. The ecliptic plane, which is the imaginary plane in which the earth orbits the sun and a universal astronomical and astronautical reference plane, intersects the spheroid along the line 26. The spheroid may be provided with scales along the line 26 which may either be engraved or embossed into the material of the spheroid or may be applied thereto by means of a tape member or may be painted thereon. Navigation star positions and the position of the vernal equinox can also be plotted on the spheroid in correct relationship to the sun's center, planets and spacecraft but have not been shown on this particular model. A plurality of scales may be placed on the oblate spheroid to coincide with each orbital plane of each respective planet or spacecraft. These scales may be utilized to show the following data for each planet and interplanetary spacecraft:

(1) Distance from the sun's center to the spacecraft or planet's center.
(2) Heliocentric orbital longitude.
(3) Heliocentric orbital velocity.
(4) The intersection of the orbital plane of the planet or spacecraft with the orbital plane of the earth.
(5) The points of nearest and farthest distances of the spacecraft or planet's center from the sun's center.
(6) The position of the vernal equinox.
(7) Argument of peridhelion.
(8) Longitude of peridhelion.

Extending upwardly within the transparent oblate spheroid 20 is a stationary cylindrical support column 28 having an attachment flange 30 which may be secured to the support plate 23 by any desirable means. The support plate 23 is secured to the uppermost end of the support stand 22. The drive shaft 25, FIG. 1a, from the drive motor (not shown) which is located inside the support stand extends upwardly through the support column 28 which is hollow and engages the drive unit 32 which is located intermediate the ends of the support column 28. Drive unit 32 is bearing mounted on to and is supported by cylindrical support column 28 as shown in FIG. 5A, except the drive unit would not be inclined at an angle. Located above the drive unit 32 is a transparent transtage 34 which is a spherical member inserted within the length of the tube 28. This is to enable the viewing of a .5 mm. diameter sphere 35 which designates the sun's center and which is embedded in a transparent section of the drive shaft. Half of a common coupling 36 is located at the uppermost end of the support column 28 to provide connecting means for additional drive units similar to the drive unit 32, thus providing interchangeability with the system shown in FIG. 2.

The drive unit 32 is adapted to provide the power take-off for moving the earth about the sun's center, as well as providing the power for turning the earth about its axis and for rotating a satellite, either natural or artificial, about the earth. Extending outwardly from the drive unit 32 is a hollow telescope drive tube 38 and drive shaft within which is provided with an equatorial orientation unit 40 to which the drive connections for a particular planet or spacecraft may be coupled. The drive unit 32, tube 38, the shaft therein, and unit 40 may be similar to the drive shown in detail in FIGS. 5a and 5b except drive unit 32 would be mounted perpendicular to the cylindrical support column. Extending outwardly from the unit 40 are a plurality of support links 41 which are connected to and support a transparent geocentric globe 44. Mounted within the globe 44 and concentric therewith is a model of the earth 52 which is supported on and driven from the unit 40 by means of a plurality of tubes and joint members having a drive shaft located therein and generally designated by the numeral 42. The gearing within the unit 40 and the drive shaft within the tubing 42 provide the necessary drive arrangements for rotating the earth about its own axis while maintaining the proper equatorial orientation. The transparent geocentric globe 44 may be provided with a plurality of parallel lines 46 of right ascension and declination. Parallel lines of geocentric longitude and latitude may be placed upon the surface of the earth model, if desired. Also scales which coincide with the spacecraft's orbital plane can be included on the globe to show the spacecraft's distance from the earth, orbital velocity, geocentric right ascension and declination, apogee and perigee points, and the ascending and descending nodes. The line 48 on the globe 44 designates the ecliptic plane. The globe 44 is provided with an access lid 50 similar to the access dome 24 on the transparent oblate spheroid to enable the interchangeability of the elements within the globe.

Mounted on the earth support tube 42 adjacent the earth model 52 is a spacecraft drive unit 54 which is identical in construction arrangement to the drive unit 32 or that shown in FIGS. 7 and 7A, depending on the simulated orbit's eccentricity. The drive train 57 for the spacecraft 56 is provided with a telescopic connection since the orbit desired, in this case, will be an elliptical orbit about the earth. A telescopic drive arrangement similar to 38 or as shown in FIGS. 7 and 7A is provided. The drive train 57 enables the spacecraft to rotate about its axis as the spacecraft rotates about the earth 52.

Extending outwardly from the base 22 and mounted thereon for 360 degree movement there about is a horizontally extending frame 58 which is secured to plates 59 which in turn are rotatably mounted on the support stand 22.

The "manual vernier adjustment" hand wheel 61 operates a gearing arrangement which causes the "central drive shaft," 25 FIG. 1A, to rotate when the drive motor is not running. The "manual vernier adjustment" is utilized to exactly position any arrangement inside the transparent oblate spheroid 20. If the drive motor programmer 55 does not cause the particular arrangement inside the transparent oblate spheroid to stop at the desired time or position as indicated on the twenty-year time resolver 68, or as viewed through the optical viewing and scale reading unit 73, the hand wheel 61 can be pressed forward and rotated to cause the central drive shaft to rotate until the exact time or position is achieved.

Hand wheel 61 (FIGS. 1 and 1a) is attached to shaft 62 which is mounted in the frame 58 for axial sliding movement. On the opposite end of shaft 62 is attached gear 63 which meshes with rotatable gear 60 only when hand wheel 61 is pressed forward. Friction gear 27, which is always in contact with rotatable gear 60, is mounted on shaft 29 which extends through the support stand wall 22. Gear 31 is mounted on the opposite end of shaft 29 from friction gear 27. Gear 31 always meshes at 90° with gear 33 which is mounted on the central drive shaft 25. Therefore, when hand wheel 61 is pressed forward and rotated, the central drive shaft is caused to rotate by action of the gear arrangement described. The second ring gear 64 is fixedly attached to the support stand 22 and is in meshing engagement with a gear 66 secured to shaft 65 which is rotatably journaled in the horizontal frame 58. The outer end of the shaft 65 is connected to the heliocentric ecliptic longitude meter 67 which is secured on the horizontal frame 58. As the horizontal frame 58 rotates about the stand 22 the shaft 65 will be caused to rotate and the motion thereof will be imparted to the longitude meter and the exact position of the frame with respect to the stand will register on the meter in degress, minutes, and seconds.

Also mounted on the frame 58 adjacent the longitude meter 67 is a twenty-year time resolver 68. The twenty-year time resolver computes and displays universal and ephemeris time as each arrangement is driven through its motions inside the transparent oblate spheroid. The rotation of the main drive shaft 25 within the support column 22 is transmitted to the servo box 69 secured to the support stand 22. The servo box 69 converts the motion of the drive shaft into electrical signals which are transferred to the twenty-year time resolver 68 by means of the multiconductor cable 70. The signals received by the time resolver 68 are converted into universal time which may be displayed in years, months, days, hours, minutes and seconds. Ephemeris time may be displayed in Julian day numbers in increments to the fifth or sixth decimal place, it is also contemplated that sidereal time can be displayed, if desired.

Also mounted on the frame 58 adjacent the longitude meter 67 is the drive motor programmer 55 which programs the running time of the system drive motor located inside support stand 22 and connected to central drive shaft 25, which drives the arrangements located inside the transparent oblate spheroid. The programmer can be set to drive the arrangements to any desired time period or position within a twenty-year range. The time resolver 55 is connected to the drive motor by means of electrical conductors which are included in multi-conductor cable 70 that connects the time resolver to the servo box. The cable 70 may be provided with a spring take-up reel intermediate the ends thereof so that the excess wire necessary for the 360 degree rotation of the frame 58 about the stand 22 may be neatly stored. It is also contemplated that a slip ring connection between the frame and the support stand could be utilized to provide the electrical connections between the time resolver and drive motor programmer with the servo box and drive motor respectively.

Extending upwardly from the horizontal rack 58 is a vertically extending curved rack member 71 which has for its center of curvature the sun's center 35. The vertical rack 71 is provided with screw thread 71' and a cross frame 72 is adapted to be screwed up and down the vertical rack. Secured to the cross frame 72 for movement therewith are an optical viewing and scale reading unit 73 and a heliocentric ecliptic latitude meter 74. A hand wheel 75 is mounted on the frame 72 and is adapted to drive a nut 75 which is mounted for rotation on the cross frame 72 and which travels along the threads 71' on frame 71 so as to move the frame 72 up and down with respect to frame 71. One of the vertical uprights of the frame 71 may be provided with an elongated gear rack 71" recessed within the threads 71' and a rotatable gear member 74' extending outwardly from the latitude member 74 is in meshing engagement with the rack 71" so as to translate the relative motion between 71 and 72 into a reading on the meter in degrees, minutes, and seconds.

All of the various meters, time resolvers, motor programmers, and optical viewing units are available on the open market and since the present invention is not concerned with the detailed workings of these devices, it is not necessary to go into a greater detailed description of these elements.

Figure 2:
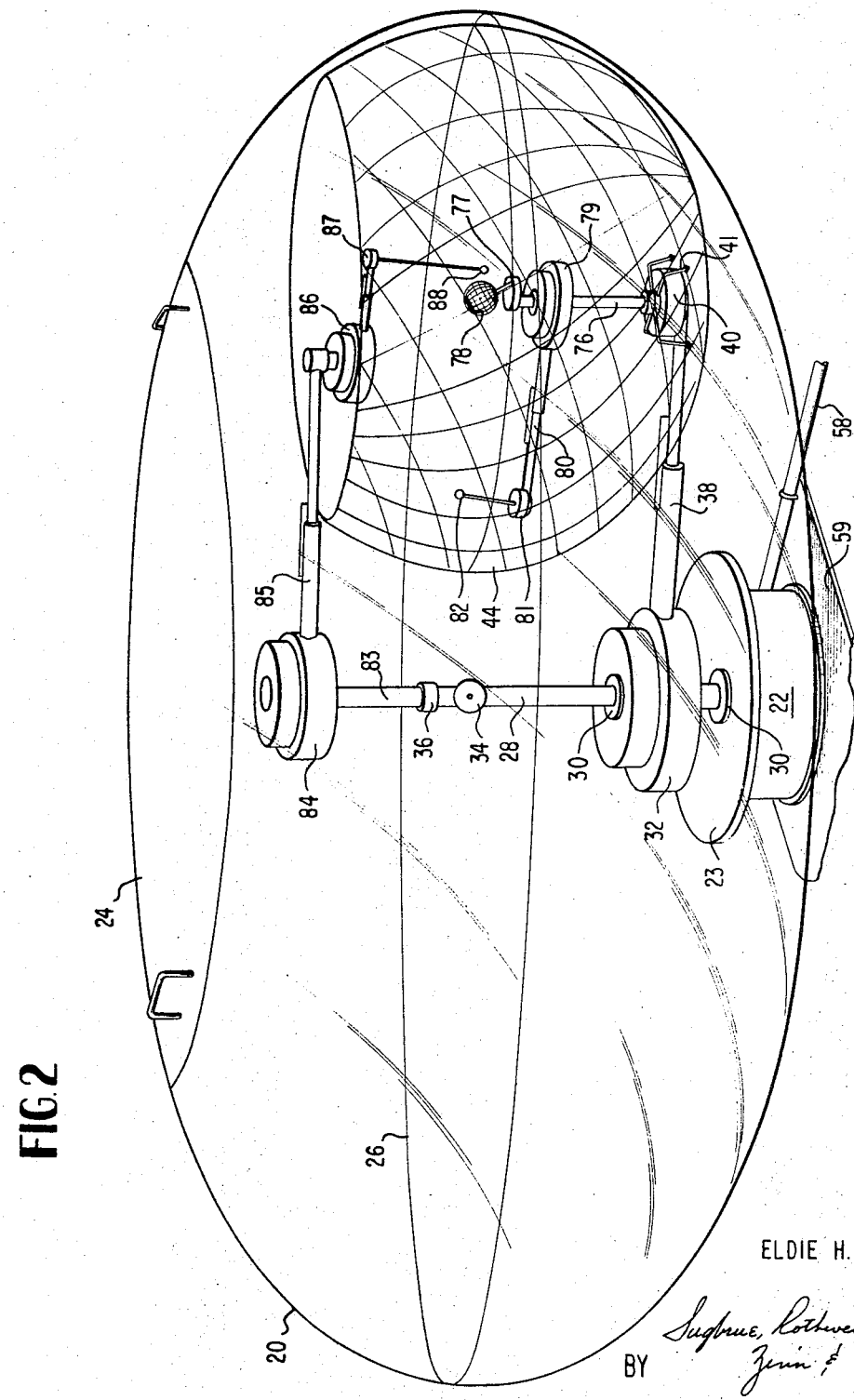

Turning now to FIG. 2, we see that the system has been arranged as a heliocentric-geocentric earth-moon space flight simulator. The major portion of the support stand 22 and the movable meter supporting framework has been substantially removed since it is exactly the same and the only differences being in the arrangement within the transparent oblate spheroid 20. The lid 50 for the geocentric globe 44 has been removed, as well as the earth model 52, the satellite 56 and the drive arrangement 54, 57 therefor. In FIG. 2 an auxiliary support column 76 is connected to the coupling unit 40 on the outer end of the drive tube 38 within which a drive shaft is included. Intermediate the ends of the auxiliary support column 76 is located the geocentric moon drive unit 79 which is adapted to drive the moon 82 about the reduced scale earth model 78. The drive unit 79 also provides motion through the telescopic drive unit 80 the moon's equatorial orientation unit and 81 so that the same surface of the moon will always be presented to the earth. The telescopic drive unit 80 the moon's equatorial orientation unit 81 are identical in construction arrangement to the drive units 38 and 40 enable the moon the follow an elliptical path about the earth while maintaining its proper equatorial orientation. The earth 78 is rotated about its axis and the axis is maintained at its proper inclination by means of the drive unit 77 secured to the uppermost end of the support column 76. A detailed description of the mechanism within the various drive units will be discussed later.

A spacecraft drive unit has been added to the uppermost end of the support column 28, and central drive shaft 25, FIG. 1A. A support column extension 83 is secured at the common coupling 36 and is provided at its upper end with an earth-moon-spacecraft heliocentric orientation unit 84 for maintaining constant spacecraft drive unit geocentric orientation. The unit 84 also imparts rotary motion to the spacecraft geocentric drive unit 86. The heliocentric drive portion of unit 84 is identical to the heliocentric drive portion of the earth unit 32. Extending outwardly from the drive unit 84 is a telescopic drive tube 85 identical in construction arrangement to the telescopic tube 38. On the outer end of the drive tube 85 an earth-moon spacecraft geocentric drive unit 86 is mounted. The design and orientation of this unit is to be determined by the specific mission under consideration but is basically a unit as shown in FIG. 5 or FIG. 7 depending on the spacecraft's flight path. A drive for providing motion about the center of mass of the spacecraft 88 is provided through the drive train 87 which also incorporates a telescopic drive. The general arrangement shown in FIG. 2 could also be used to simulate an aerospace shuttlecraft for round trips between the earth and an orbiting laboratory or assembling space station. Thus, it is seen that in FIG. 2 the spacecraft 88 may take off from the earth and follow the proper trajectory outwardly to the moon 82 and return to earth 78 if the mission is round trip. In addition to the parallel lines and geocentric right ascension and declination shown on the globe 44, scales which coincide with the respective orbit planes of the moon and spacecraft can be included on the globe to give the moon and spacecraft distance from the earth, orbital velocity, geocentric right ascension and declination, apogee and perigee points, the ascending and descending nodes, and the distance from the spacecraft to the moon.

Figure 3:
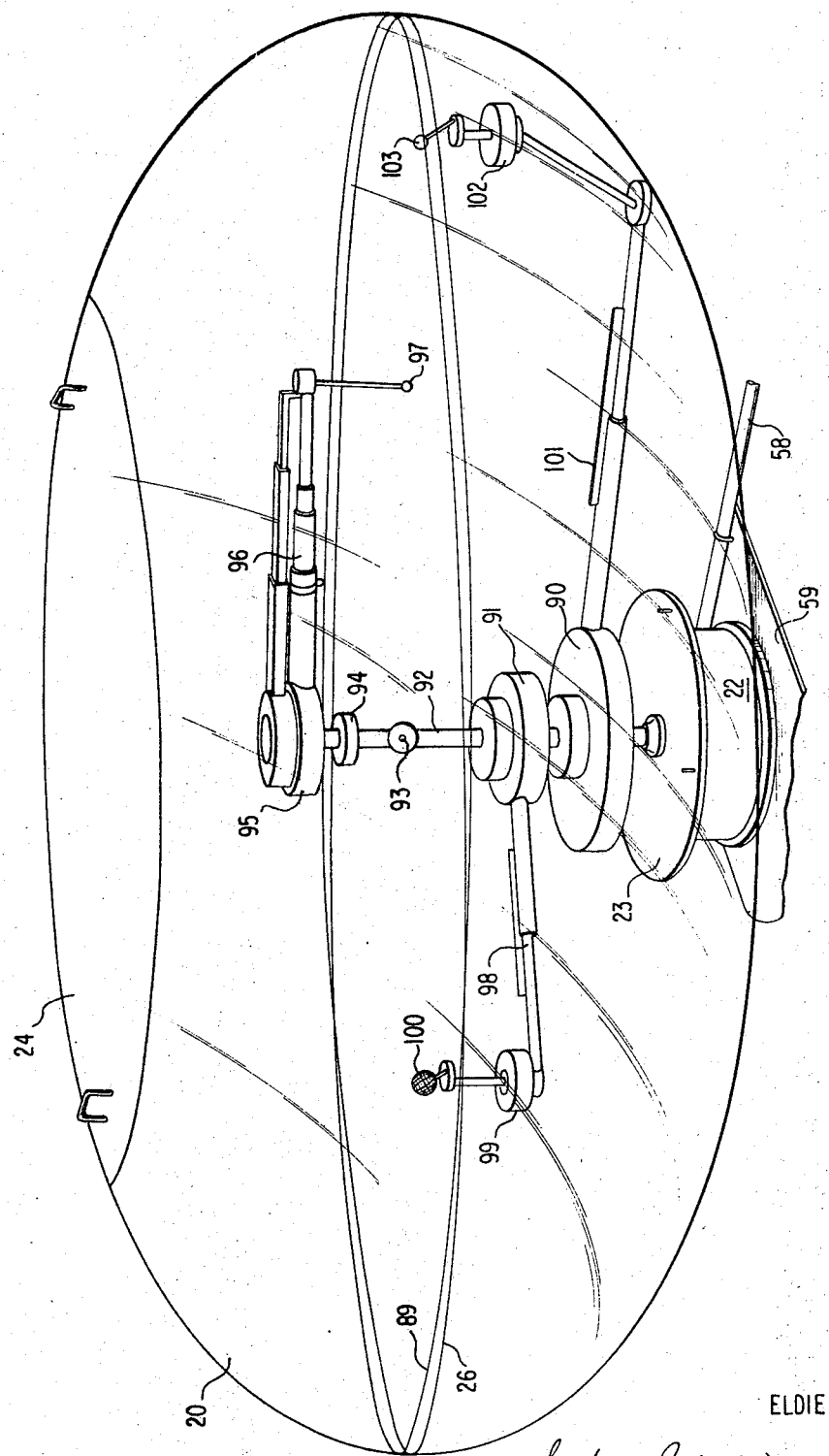
Figure 4:
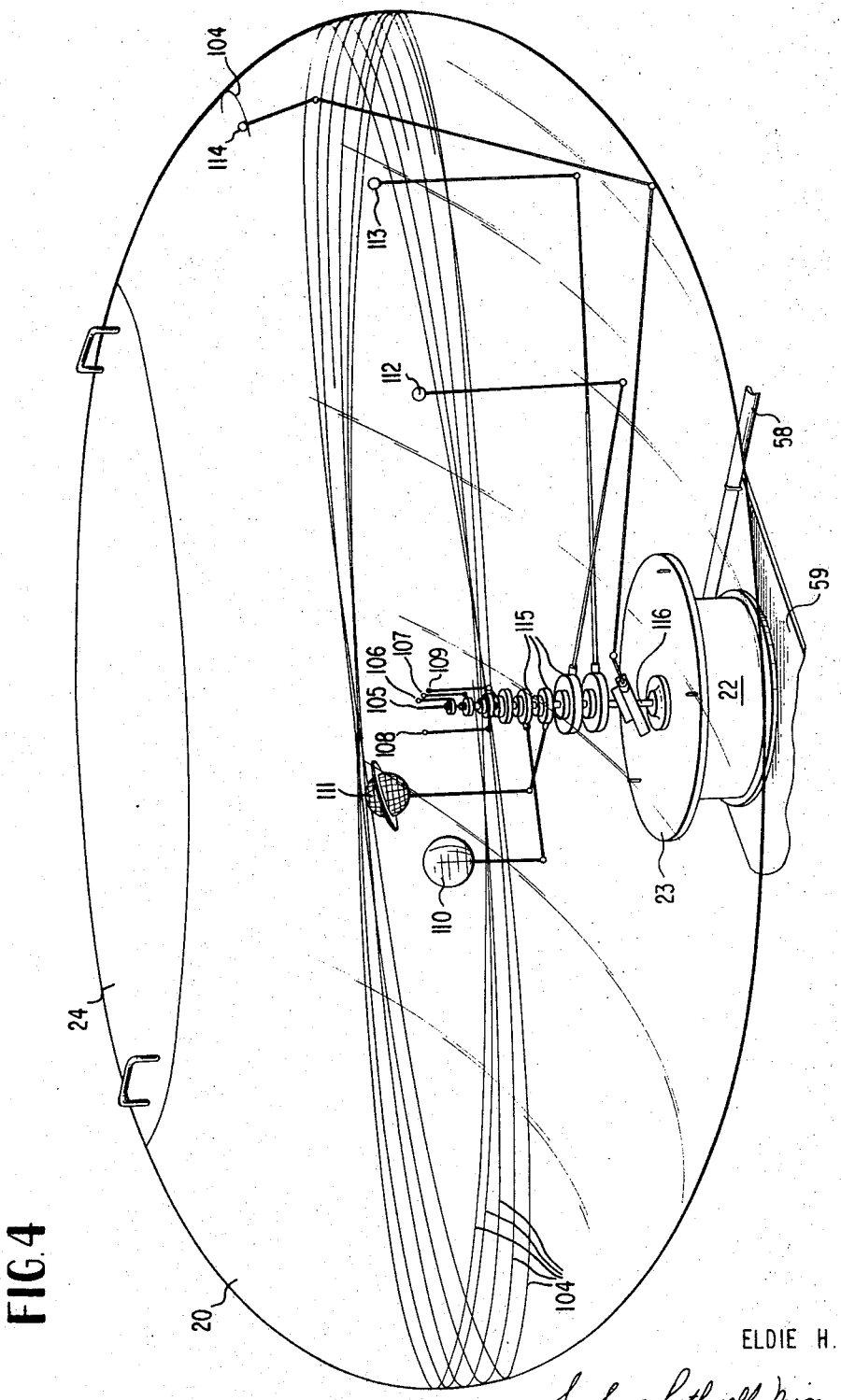

With respect to the arrangement shown in FIG. 3, we see that everything has been replaced within the transparent oblate spheroid 20 that was present in either FIG. 1 or 2. A new cylindrical support column 92 within which is mounted a central drive shaft such as 25 in FIG. 1A having the sun's center indicated by the dot 93 has been mounted on the top plate 23 of the support stand 22. Intermediate the plate 23 and the sun's center 93 an earth drive unit 91 and an additional planet drive unit 90 are mounted. The drive unit 90 could be arranged to drive any of the planets in the solar system and for the purposes of this example, the planet 103 will be considered as the planet Mars. The upper end of the support column 92 and central drive shaft 25 within are provided with a common coupling 94 to which is secured a spacecraft heliocentric drive system unit 95. The drive unit 95 is identical in construction arrangement to the drive unit shown in FIG. 7 but the exact design and orientation thereof will be determined by the specific interplanetary flight trajectory considered. The motion of the drive unit 95 is imparted to the spacecraft 97 by means of the telescopic drive connection 96 which is identical in construction arrangement to that shown in FIG. 7. The earth model 100 is rotated about its own axis and maintained at its proper equatorial orientation by means of the drive unit 99 secured to the outermost end of the telescopic drive connection 98, which in turn is connected to the earth drive unit 91 on the main support column 92. Likewise, the planet Mars is rotated about its axis and is maintained at the proper equatorial orientation by means of the drive unit 102 mounted at the outermost end of the telescopic drive connection 101, which in turn is connected to the planet drive unit 90. The drive unit 102 could be connected directly to the telescopic drive arrangement 101 or an intermediate drive tube as shown in FIG. 3 could be interposed therebetween depending upon the space requirements determined by the shape of the transparent oblate spheroid. The transparent oblate spheroid 20 is provided with the lines 26 and 89 which represent the orbital planes of Earth, Mars and the spacecraft. Once again, scales may be located along these lines to show distances, velocities and the various positions of the planets and spacecrafts with respect to each other and the sun's center. Also, scales can be projected against the upper portion of the spheroid which will give the departure planet to spacecraft distances; spacecraft to target planet distances and the distances between the departure planet and target planet for all times during the space flight mission. In this arrangement, the spacecraft 97 is adapted to take off from the earth 100 and follow the proper trajectory through the intervening space to the planet Mars 103, and return if the mission is round trip while the two planets follow their proper paths through space. It is obvious for trips to planets closer to the sun, the earth would be the outermost planet. Also, additional heliocentric planetocentric drive systems may be added to cylindrical support column 92 and central drive shaft 25 therein to simulate by-planet missions or Venus swing-by Mars missions.

Turning now to the arrangement in FIG. 4, we see that once again an entirely new unit has been mounted within the transparent oblate spheroid 20. The arrangement is a precision scale model of the nine planets within the solar system. The planet models, 106 through 114, are simultaneously driven about the sun's center 105 in their correctly scaled and oriented elliptical orbits at the proper velocities. In addition, the planet models rotate about their polar axes at the proper rates and correct equatorial orientations. The planet models are correctly pre-positioned in their respective orbits and on their polar axes of rotation with respect to time and are therefore always in the proper orbital and axial positions at any instant in time. The transparent oblate spheroid 20 is provided with markings 104 which designate the orbit planes of each of the planets. If the scale readings along the lines 104 are permanently etched into the transparent spheroid, it is obvious that the spheroid would also be replaced when changing from system to system. However, the scale readings and other orbital markings can be included on a thin film transparent material which can be accurately attached to the spheroid, if desired. Secured to the upper surface of the plate 23 is a support column 116 and central drive shaft therein upon which are located the planet drive units 115, one for each of the nine planets. The uppermost end of the support column 116 has the center of the sun 105 secured thereto. Each of the drive units 115 is identical in construction arrangement to the drive units 32, 91 and 90 shown in the previous embodiments and described more fully in detail in FIG. 5. The 9 planets being driven in their proper paths about the sun's center 105 are Mercury 106, Venus 107, Earth 108, Mars 109, Jupiter 110, Saturn 111, Uranus 112, Neptune 113 and Pluto 114.

FIG. 5 shows the schematic view of a typical planet drive arrangement from the main support column 120 having a drive shaft 122 journaled therein. The elliptical or circular orbit drive unit is designated generally by 117 and the equatorial orientation unit is designated generally by the numeral 180. The planet 118 may be any of the nine planets and the main drive unit housing 126 will be inclined at an angle relative to the main support column 120 depending upon the inclination of the planet's orbital plane. The drive unit 117 is shown in greater detail in FIG. 5a and the equatorial orientation unit 180 is shown in greater detail in FIG. 5b.

Turning now to FIG. 5a, we see that the main support column 120 has the shaft 122 journaled therein by means of bearings 128. The main support column 120 is interrupted by means of the drive unit cylindrical support 124 which may be secured to the cylindrical support column 120 at the desired orbital inclination angle. Mounted for rotation about the cylindrical support 124 is the gear assembly housing and systems support 126. Integrally positioned within the wall of the cylindrical member 124 is a speed changer unit 130 having therein a typical epicycle speed changing gearing. The speed changer unit 130 is provided with an input shaft 132 and output shaft 134. A beveled gear 136 is fixed for rotation with the main shaft 122 and is in mesh with beveled gear 138 secured to the input shaft 132 of the speed changer unit. An elliptical gear 140 is secured on the output shaft 134 of the speed changer unit and is in mesh with elliptical gear 144 secured to stub shaft 142 journaled for rotation in the housing of the speed changer unit 130. Also secured on the stub shaft 142 is a circular beveled gear 146 in mesh with beveled gear 148 which in turn is secured to a hub member 150 journaled for rotation about the cylindrical support column 124 by means of bearings 128. A plurality of drive pins 151, only one of which is shown, are secured to the hub 150 for rotation therewith and are secured at their opposite ends to the gear housing 126. Also extending radially outwardly from the hub 150 is a shaft guide and support 152 which slidably receives therein a grooved shaft 154. A stationary cam plate 158 is secured to and completely surrounds the cylindrical support column 124 and is provided in its upper surface with an elliptical gear 160 and in its lower face with a cam groove 176. A gear 156 is slidably mounted on the groove shaft 154 and meshes with the elliptical gear 160 cut in the upper face of the stationary cam 158. The gear housing 126 is provided with a radially extending hollow portion 127 which encompasses the shaft support 152, the shaft 154, and the stationary cam plate 158. Also located within the gear housing extension 127 is a second speed changer unit 162 also of the epicycle gear type. The grooved shaft 154 provides the input to the speed changer unit 162 and the output shaft 164 is journaled in the opposite side of the speed changer unit 162. Secured to the speed changer unit 162 is a cam follower 178 which is adapted to follow the cam track 176 cut in a lower surface of the stationary cam plate 158. Also secured to the speed changer unit for movement therewith is a hollow tube member 166 which is slidable in the cylindrical extension arm 168 which is connected to the gear housing extension 127. The output shaft 164 of the speed changer unit 162 is journaled within the hollow tube 166 and is provided at its opposite end with a beveled gear 184 as shown in FIG. 5b. A spline connection is provided between the cylindrical extension 168 of the gear housing and the slidable hollow tube 166 as shown in FIG. 6. To achieve this end, the cylindrical member 168 is provided with an open ended elongated groove 172 and the slidable tube 166 has a spline 174 secured to the surface thereof and which is slidable in the groove 172, as shown in FIG. 6.

In FIG. 5b the equatorial orientation unit 180 is shown in greater detail and comprises a drive shaft 182 having a gear 186 on one end thereof in mesh with the gear 184 on the end of the shaft 164. Secured to the outer end of the slidable sleeve 166 is a gear box 185 which houses the gears 184, 186. Integrally secured with the gear box 185 is the main housing 187 for the orientation unit. A shaft support sleeve 188 extends inwardly of the housing 187 and is concentric with and supports the shaft 182. Secured to the shaft support housing 188 is an epicycle type gear changing unit 190. The gear changer unit 190 is provided with an input shaft 192 having a gear 194 secured thereto and in mesh with a gear 196 secured to the shaft 182. The output shaft 198 of the speed changer unit 190 has an elliptical gear 200 secured thereto and in mesh with a second elliptical gear 204 secured to the stub shaft 202 journaled for rotation in the housing of the speed changer unit 190. Also secured to the stub shaft 202 is the circular beveled gear 206 which is in mesh with a second circular beveled gear 210 secured to a rotatable elongated tube member 208. The tube member 208 rotates relative to the shaft 182 which extends within the tube 208 and the housing 187. Bearings 212 are provided between the housing 187 and the sleeve 208. The outer end of the tube 208 is secured to an additional gear housing 214 which is rotatable therewith. The shaft 182 extends into the housing 214 and has a gear 220 secured thereto and in mesh with the gear 218 on the end of the shaft 216 which extends outwardly of the housing 214 and has the planet 118 mounted thereon.

Turning now to a functional description of the elliptical or circular orbit drive unit shown in FIGS. 5a, 5b and 6 we see that rotation of the shaft 122 causes the gear pair 136, 138 to drive the speed changer 130. The period of rotation of the output shaft of the speed changer 130 shall equal the orbital period of the orbiter. Elliptical gears 140 and 144 shall each have the same eccentricity as the orbit being traversed by the orbiter. Elliptical gears 140 and 144 are mounted on the output shaft of the speed changer and the stub shaft 142 to cause the shaft 142 to rotate at the same elliptical rate and in phase with the orbital motion of the orbiter. Circular gear 146 is also mounted on shaft 142 and meshes with gear 148 which rotates and drives the hub 150, the shaft guide and support 152, the shaft 154, and the gear housing 126, 127 about the axis of the cylindrical support column 124. Since gear 156 is in mesh with the stationary elliptical gear path 160, the shaft 154 will rotate about its axis. The stationary elliptical gear path 160 shall have the same eccentricity as the orbit being simulated. Also the elliptical gear path 160 shall be mounted about the axis of the support tube 124 so that its foci will correspond to, and be in line with, the perihelion or perigee point of the orbiter's orbit. That will cause the gear 156 to be driven by a variable radius which will counteract the elliptical speed at which the grooved shaft 154 will revolve about the axis of support tube 124. Therefore, the grooved shaft 154 will rotate about its own axis at a constant rate.

The speed changer 162 is driven by the shaft 154 and imparts the correct rotational motion to the extended shafting which drives the equatorial orientation unit 180 and the orbiter 118 at its proper rate about its correctly oriented equator and/or spin axis.

The cam follower 178 will engage the stationary cam path 176 and cause the orbiter's centerpoint to follow its prescribed elliptical path about the center point of the primary, which will be the sun if the orbiter is a planet. This is accomplished by constructing the path of the stationary cam groove 176 with respect to a point on the stationary cam plate 158 which is determined by a straight line which is perpendicular to the surface of the plate 158 and intersects the primary's center. As cam follower 178 traverses its path along the stationary cam 176 the grooved shaft 154 moves back and forth inside the shaft guide and support 152 in accordance with the ellipticity of the orbit being simulated. Therefore, speed changer 162 and its extended attachments slide back and forth inside the gear assembly's housing and system support 126, 127 and 168. However, gear 156 follows elliptical gear path 160 causing the grooved shaft 154 to slide back and forth through the gear 156.

The splined arrangement shown in FIG. 6 enables the shaft 182 to remain perpendicular to the orbit plane. If the orbiting body is a planet or natural satellite, the equatorial orientation unit 180 causes the equatorial plane of the planet or natural satellite to remain properly oriented with respect to the orbit plane and vernal equinox as the body moves along its orbit and rotates about its spin axis. If the orbiting body is a spacecraft, the same mechanism can be utilized to cause the spacecraft to remain properly oriented. With respect to the operation of the equatorial orientation unit, the gear pair 194, 196 drives the speed changer 190 to rotate the output shaft 198 of the speed changer at the same speed as the orbital period of the orbiter. Elliptical gear 200 is mounted on the output shaft of the speed changer 190 and meshes with elliptical gear 204 to rotate the circular gear 206 and rotate the gear 210 which drives the housing and support member 208 in the direction which is counter to the direction the orbiter is moving in its orbit. The housing and support tube 208 makes one complete rotation as the orbiter makes a revolution about the center point of the primary. Elliptical gear pair 200 and 204 shall have the same eccentricity as the orbit and they shall be mounted to cause the tubular housing and support 208 to rotate at its maximum rate when the orbiter is passing through the perihelion or perigee point and rotate at the minimum rate when the orbiter is passing through the aphelion or apogee point. That will keep the equatorial plane, or spin axis correctly oriented as the orbiter continually changes orbital velocity in accordance with the ellipticity of the orbit.

The gear pair 218 and 220 mesh at an angle equal to the inclination of the equatorial plane or spin axis of the orbiter. If the spin axis of the orbiting body, that is, a planet, natural satellite or spacecraft is perpendicular to the orbit plane, the equatorial orientation unit and gear pair 218 and 220 will not be required.

If the orbiter's same side always faces the center point of the primary, shaft housing and support tube 208 and shaft 216 shall rotate at the same speed but in opposite directions. The rotation of the moon about the earth is an example of this situation.

The inclination of the orbiter drive unit shown on this drawing is greatly exaggerated, except for the planet Pluto. If the orbit is about the moon or a planet, a gear pair such as 136 and 138 can mesh at 90 degrees to form a simple two gear power takeoff and the orbital inclination can be achieved by a combination of angularly oriented drive shafting arrangements on which a drive unit can be mounted.

If the orbit of the orbiter is circular, the elliptical gear pairs 140, 144 and 200, 204 will not be required and circular gears 146 and 206 will be mounted directly to the output shafts of the speed changers 130 and 190, respectively. Also, the stationary elliptical gear path 160 will be circular, as will the path of the cam follower 178 about its center point. The gear assembly's housing and system support 126, 127 and 168 can be fixed to sleeve 166 because no sliding action between the two is required.

As pointed out before, the center point of the primary may be the sun's center if the orbit is about the sun, or a planet's center if the orbit is about a planet, or the moon's center if the orbit is about the moon.

The ellipticity of the various orbits about the sun's center, or for that matter, the elliptical orbit of a satellite, either natural or artificial, about the center of a planet, the moon, or another satellite, will usually be such that the ellipticity of the orbiter can be achieved with the cam arrangement and telescopic shafting shown in the drive arrangement in FIGS. 5a and 5b. However, when the ellipticity of the path of an orbiter is extremely large it would be impossible to cut a cam path in the stationary cam plate 158 of the arrangement shown in FIG. 5a. Therefore, in order to achieve paths of unusually large ellipticity or to obtain the path of a spacecraft on a flight between planets, it is necessary to resort to the spacecraft telescoping drive unit illustrated in FIGS. 7, 7a and 7b.

In FIG. 7a, a support column 224 having a flange 225 is secured to a lower support column 222 having a flange 223 by means of connecting bolts 226 and nuts 227. A drive shaft part 228 is journaled within the support column 222 and the drive shaft extension 229 is journaled within the support column extension 224. A notched coupling arrangement indicated at 230 enables the drive to be transmitted from shaft 228 to shaft 229. Journaled for rotation on the support column part 224 is a slip ring unit 232 shown in greater detail and described hereinafter with respect to FIG. 8. The drive unit comprises a cylindrical support unit 234 integral with the shaft housing support column 224 and inclined at any desired angle with respect to the shaft 229 depending upon the angle of the orbital plane of the orbiter. A gear assembly housing and system support 236 is journaled about the drive unit cylindrical support 234 by means of bearings 238. Mounted on the cylindrical support 234 is an epicycle speed change unit 240 having an input shaft 242 and output shaft 244. A beveled gear 246 is secured for rotation with the shaft 229 and is in mesh with another beveled gear 248 secured for rotation with the input shaft 242. An elliptical gear 250 is secured to the output shaft 244 and meshes with a second elliptical gear 254 mounted on shaft 252 which in turn is journaled in the housing of the speed change unit 240. Also mounted on the stub shaft 252 is a circular gear 256 meshing with circular gear 258. Gear 258 is mounted for rotation about the support column 234 by means of bearings 238 and is formed with a hub member 260 to which is secured a plurality of drive pins 262 which drive the gear assembly housing and systems support 236 about the axis of the support tube 234.

The housing 236 has a speed changer 274 of the epicycle type mounted therein for rotation with the housing 236 near the outer extremity thereof. The speed changer 274 is provided with an input shaft 272 and an output shaft 282. The input shaft 272 is splined to enable the gear 276 to slide thereon. The inner end of the shaft 272 is secured to a hub member 268 having a radially extending shaft support tube 270. The hub 268 is journaled for rotation relative to the cylindrical support 234.

Secured to the support 234 is a stationary split gear assembly comprising, a split gear half 264 and a split gear half 266 one on each side of the gear 276. The bottom surface of the split gear half 264 is provided with a cam-like gear track 278 and the upper surface of the split gear half 266 is provided with a cam-like gear track 280. The two cam-like gear tracks do not overlap each other and the gear 276 is adapted to mesh with first one gear track and then the other as the housing 236 and the shaft 272 rotate about the axis of the cylindrical support column 234. FIG. 10 shows the schematic layout of the gear track path of the two split gear halves.

The output shaft 282 of the speed changer 274 is secured to the end of a cylindrical drive tube 284 which is journaled in an opening in the housing 236 by means of bearings 286. The end of the drive tube 284 remote from the speed changer 274 is provided with screw threads 288 adapted to mesh with the screw threads 292 which extend the entire length of a second drive tube 290. The drive tube 290 is also provided with internal threads 294 which mesh with the threads 298 which extend the entire length of a third drive tube 296. The outermost end of the drive tube 296 is provided with an internal thread 300 which meshes with the thread on the screw member 302. The end of the drive tube 290 adjacent the speed changer 274 is provided with a circular flange 291 having a diameter slightly smaller than the internal diameter of the tube 284, so as to provide a sliding fit therewithin. The end of the drive tube 296 adjacent to speed changer 274 is also provided with a circular flange 297 having a diameter slightly less than the internal diameter of the drive tube 290, thereby enabling a sliding fit therewithin. Likewise, the screw member 302 is provided with a circular flange 301 having a sliding fit within the drive tube 296. The screw member 302 is prevented from rotating by means of a telescopic stabilizer comprising, an outer housing 304 secured to the gear assembly housing 236. The cross-section of the member 304 may be rectangular, triangular, or any other shape which will prevent rotation of the internal members within the member 304. Slidably mounted within the housing 304 is a second stabilizer member 306 having a flange 307 on one end thereof complementary in shape to the internal shape of the member 304. A second stabilizer member 308 is mounted within the stabilizer member 306 and is provided on one end thereof with a flange member 309 complementary in shape to the internal shape of the stabilizer member 306. A stabilizer rod 310 is mounted within the stabilizer member 308 and is provided with a flange 311 on one end thereof complementary in shape to the internal shape of the member 308. The opposite end of the stabilizer rod 310 is provided with a link 312 rigid at one end with the rod 310 and at the other end with the screw member 302 to prevent rotation of the screw member 302. An electric motor 314 is secured to one end of the screw member 302 by means of a motor support bracket 316. A drive shaft tube 318 extends downwardly from the motor 314 and has the drive shaft 320 journaled therein. A spacecraft model 322 is secured to the outermost end of the drive shaft 320.

The motor at 314 is provided with power by means of a wire 324 which is wound about a spring coil spool 326 which in turn is mounted on a bracket 328 which is secured to and depends from the stabilizer member 304 and surrounds the bearing 330 in which the outermost telescopic tube 284 is journaled. The spring bias spool 326 takes up any excess slack in the wire 324 as the spacecraft is moved radially inwardly and outwardly with respect to the central shaft 229. The end of the wire 324 adjacent the support column 224 is secured to a housing member 232 which is rotatable with respect to the support column 224. Secured to the support column 224 are a pair of slip rings 334 and 336. 336 is insulated from the slip ring hub 334 by means of an insulating ring 337 and the slip ring 334 is insulated from the support column 224 by means of an insulating ring 335. A pair of power supply wires 338 are secured to the slip rings 334 and 336. A pair of bushes 332 and 333 are secured to the rotatable housing 232 and bear against the upper surfaces of the slip rings 334 and 336, respectively. The wires 324 have two components each of which is connected to one of the brush members 332 and 333.

The function of the spacecraft telescoping drive unit is as follows. The spacecraft telescoping drive unit shown in FIGS. 7a and 7b will be used to simulate all time-dependent, manned and unmanned space flight missions which cannot be simulated by the elliptical or circular orbit drive unit shown in FIGS. 5a and 5b. If the eccentricity of the elliptical orbit to be simulated is so high as to cause the stationary cam 158 in FIG. 5a to be large and therefore impractical, the spacecraft telescoping drive unit must be used. All planet or natural satellite orbits can be simulated by the elliptical or circular orbit drive unit shown in FIG. 5, however, either drive unit may be used for the planet Pluto. The specific dimensions of a spacecraft telescoping drive unit shown in FIG. 7 is determined by the particular space fligh mission to be simulated.

The shaft 229 causes the gear pair 246 and 248 to drive the speed changer 240. The period of rotation of the output shaft 244 of speed changer 240 shall equal the orbital period of the spacecraft. Elliptical gears 250 and 254 shall each have the same eccentricity as the spacecraft's orbit. Elliptical gears 250 and 254 are mounted on the output shaft of the speed changer and the shaft 252 to cause the shaft 252 to rotate at the same elliptical rate and in phase with the spacecraft's orbital motion. Circular gear 256 is mounted on shaft 252 and drives the gear 258 about the cylindrical support unit 234 as well as the housing 236 by means of the drive pins 262. As the unit is driven about the axis of the cylindrical support unit 234, the gear 276 slides along the grooved shaft 272 and meshes with either gear path 278 or gear path 280 of the split gear to cause grooved shaft 272 to rotate and drive the speed changer 274. Speed changer 274 multiplies the motion of the gear 276 about path 278 or path 280 of the split gear and drives the screw operated telescoping mechanism which extends or retracts as required to keep the spacecraft in its prescribed orbit. The direction of rotation of the grooved shaft 272 reverses when the gear 276 passes from path 278 to path 280 or vice-versa. This causes the output shaft of the speed changer 274 to drive the screw operated telescoping mechanism in the extending or retracting direction as required in the orbital path of the spacecraft.

The threaded portion of the screw operated telescoping mechanism is simply a series of two or more threaded units, in this case, the tubes 284, 290, 296 and the screw member 302. Each one of these with the exception of the outer driving tube 284 will screw in or out depending upon the direction the driving unit is rotating. For design simplicity, all threads shall be the same distance apart and therefore cause the mechanism to extend or retract the same amount for each rotation of the driving unit 284 regardles of which one of the other units is screwing in or out. The telescoping stabilizer within the member 304 shows a cross-sectional shape other than round and therefore slides in and out only. The center unit or rod 310 of the stabilizer is fixed to the center screw unit 302 to prevent the screw unit 302 from rotating and thus keep the shaft 320 perpendicular to the spacecraft's orbital plane.

The electric motor 314 is attached to the end of the center screw unit and imparts rotational motion to the spacecraft. However, if the spacecraft does not require rotational motion about its center of mass, electric motor 314 will not be required and shaft 320 will connect directly to the center screw unit.

For earth-lunar and interplanetary space flight missions which require the spacecraft to go into orbit about the target planet or natural satellite, a spacecraft drive unit and motor arrangement will be attached to the center screw unit and will be constructed in accordance with the showing in FIG. 9. In FIG. 9, the rigid connecting rod 340 would be connected to the outer end of the stabilizer rod 310 and the inner end rigidly connected to the center screw member 302. An electric motor 342 is secured to the screw member 302 by means of the motor support bracket 344. The power supply wires 346 for the electric motor 342 may be connected to a slip ring housing on the main support column in the manner in which the wires 324 are connected to the slip ring assembly, shown in FIG. 8. The output shaft 347 of the motor 342 is connected to the spacecraft orbiter drive unit 354 which may be the same as the telescoping unit shown in FIG. 7 or that shown in FIG. 5. On the outermost end of the drive unit 354 an electric motor 356 is secured thereto by means of a motor support bracket 358. A drive shaft 362 is journaled in a drive shaft support tube 360 fixed to the motor 356. The spacecraft 364 is secured to the outer end of the drive shaft 362 and is adapted to orbit about the target planet or natural satellite shown in dotted lines and indicated by numeral 365. The power for the motor 356 is supplied by means of wires 350 and 352 across the drive unit 354 by means of a slip ring assembly 348 similar to the slip ring assembly shown in FIG. 8.

To enable the spacecraft to go into orbit about the target planet or natural satellite, the telescopic drive unit must remain extended at the proper distance. Ordinarily, the gear 276 would leave one split gear half, such as gear half 264 and immediately pick up the other split gear half 266, and thereby reverse its rotation to retract the telescopic mechanism. Therefore, when it is desired to leave the telescopic drive unit extended to permit the spacecraft to go into orbit about a target planet or natural satellite, a different split gear arrangement would have to be utilized which would simply disengage gear 276 at the proper times. If the mission is round trip, the spacecraft can be adapted to leave the parking orbit at the proper time and return to the departure planet, in which case, a further modification of the split gear arrangement would be required. The motor assemblies 342 or 356 may be started and stopped at the proper times by simply blanking out the unneeded part of the slip rings through which the motor circuit passes.

If the manned or unmanned space flight mission is interplanetary, the spacecraft telescoping drive unit shown in FIG. 7 would be used for the drive unit 95 shown in FIG. 3 and would be mounted above the sun's center also as shown in FIG. 3. If the mission is earth-orbital, lunar-orbital, or about a planet or natural satellite only, the spacecraft telescoping drive unit, if used, will be mounted as illustrated in FIG. 1 with the drive unit below the center of the primary. That is, the flight path out to the final orbit will not be included.

If the spacecraft is required to rotate about its center of mass, and the axis of rotation (spin axis) is not perpendicular to the orbit plane, an orientation unit and gear pair will be required as shown in FIG. 5b. The orbital inclination shown in FIGS. 5a and 7a is greatly exaggerated except for certain possible space flight missions to Mercury and Pluto.

Obviously, many modifications and variations of the present invention are possible in the light of the above teachings, as for example, the arrangement may be non-portable. It is therefore, to be understood, that within the scope of the appended claims, the invention may be practiced otherwise than as specifically described.

What is claimed is:

1. A space motion simulator system comprising base means, drive means mounted in said base means and including vertically disposed drive shaft means, hollow support column means mounted on said base means about said drive shaft means, a first orbital unit for orbiting a body about a point on the axis of said drive shaft means comprising cylindrical housing means having one end thereof detachably secured to the upper end of said support column, drive shaft extension means rotatably mounted in said housing means and detachably secured to said drive shaft means in vertical alignment therewith, hollow arm means having a hub portion journaled for rotation about said cylindrical housing means and extending radially outwardly from said hub portion, additional drive means intermediate said shaft extension means and said hub portion for rotating said hub portion and arm means about said housing means, said first orbital body rotatably mounted on the outermost end of said arm means and orbital body drive means extending through said arm means in operative driving relation between said housing means and said orbital body to rotate said orbital body about its axis of rotation of said arm means about said housing means, said arm means being comprised of a telescopic supporting member and said orbital body drive means including a shaft member rotatably carried by said telescopic supporting member for reciprocating movement radially of said hub portion, elliptical cam track means secured to and surrounding said cylindrical housing means, cam follower means secured to said telescopic supporting member and disposed in engagement with said elliptical cam track means to cause said first orbital body to move in an orbital path about said point on the axis of said drive shaft means as said arm is rotated about said cylindrical housing means by said additional drive means, said additional drive means including an elliptical gear set intermediate said drive shaft extension in said arm to drive said arm means about said cylindrical housing means at a variable rate in phase with said elliptical orbital path of siad first orbital body, gear track means parallel to and spaced from said elliptical cam track means and gear means secured to said shaft member disposed in mesh with said gear track means to rotate said shaft member at a constant speed as said arm means rotates about said cylindrical housing means at a variable speed.

2. A space motion simulator as set forth in claim 1 wherein said shaft member is drivingly connected to said first orbital body to rotate said orbital body about its axis of rotation and further comprising axis orientation means for maintaining said axis of rotation of said orbital body at the proper inclination with respect to the orbital plane of said first orbital body.

3. A space motion simulator system as set forth in claim 1 further comprising a transparent oblate spheroid secured to the upper surface of said base means and encompassing the entire orbital path of said first orbital body, said spheroid being provided with markings to indicate the orbital plane of said first orbital body and to enable calculations of relative distances, positions and velocities.

4. A space motion simulator system as set forth in claim 3 further comprising instrument carrying rack means mounted on said base for 360° rotative movement about said base and said transparent oblate spheroid, optical viewing and scale reading means mounted on said rack means and movable with respect thereto, indicator means mounted on said rack means for indicating the latitude and longitude of said unit with respect to said spheroid, time resolving means mounted on said rack means and adapted to indicate the relative elapsed time with respect to the movement of said orbital body within said transparent spheroid and drive programming means secured to said rack and adapted to drive said orbiter according to a predetermined program.

5. A space motion simulator system as set forth in claim 1 wherein said cylindrical housing means has the longitudinal axis thereof disposed at an angle relative to the axis of said drive shaft extension means whereby the orbital plane of said first orbital body will be disposed at the proper angle relative to the axis of said drive shaft extension means.

6. A space motion simulator system as set forth in claim 5 further comprising a plurality of additional orbital units similar to said first orbital unit, said units being secured to each other with the drive shaft extension means of each unit disposed in vertical axial alignment with said drive shaft means; said cylindrical housing means of each of said units being disposed at a different angle relative to the axis of said drive shaft means whereby the orbital body of each of said units will be disposed in an orbital plane passing through said point but distinct from the orbital planes of the other additional orbital units to represent the orbital motion of a plurality of planets about the sun.

7. A space motion simulator system as set forth in claim 1 wherein said additional drive means includes elliptical gear means for driving said hub portion about said cylindrical housing portion at a variable speed and further includes stationary gear track means, extensible screw means mounted on said arm means, gear follower means secured to said extensible screw means and meshing with said gear track means whereby rotation of said arm means and hub portion about said cylindrical housing means causes said gear follower means to rotate said extensible screw means to move said first orbital body radially with respect to the axis of said drive shaft means while preventing rotation of said arm means about the axis of said screw means.

8. A space motion simulator system as set forth in claim 7 wherein said gear track means comprises a split gear, each gear portion containing half of said gear track being disposed in spaced parallel planes diametrically opposite each other, said gear follower means being disposed intermediate said planes so that when said gear follower means is in contact with one-half of said split gear track, said screw means will be rotated in one direction to move said first orbital body in one radial direction and when said gear follower means is in contact with the other half of said split gear track said screw means will be rotated in the opposite direction to move said first orbital body in the opposite radial direction.

9. A space motion simulator system as set forth in claim 7 wherein said extensible screw means includes a plurality of hollow telescopic screw members and a central telescopic screw rod and means preventing rotation of said screw rod, said rod being connected to said first orbital body and the outermost of said hollow screw means being connected to said gear follower means.

10. A space motion simulator system comprising base means, drive means mounted in said base means and including vertically disposed drive shaft means, hollow support column means mounted on said base means about said drive shaft means, a first orbital unit for orbiting a body about a point on the axis of said drive shaft means comprising cylindrical housing means having one end thereof detachably secured to the upper end of said support column, drive shaft extension means rotatably mounted in said housing means and detachably secured to said drive shaft means in vertical alignment therewith, hollow arm means having a hub portion journaled for rotation about said cylindrical housing means and extending radially outwardly from said hub portion, additional drive means intermediate said shaft extension means and said hub portion for rotating said hub portion and said arm means about said housing means, said first orbital body rotatably mounted on the outermost end of said arm means and orbital body drive means extending through said arm means in operative driving relation between said housing means and said orbital body to rotate said orbital body about its axis of rotation upon rotation of said arm means about said housing means, a satellite orbital unit similar to said first orbital unit mounted on said arm in driving relation with said first orbital body drive means intermediate said first orbital body and said first orbital body drive means for rotating said satellite orbital body about a point on the axis of rotation of said first orbital body and at least one additional orbital unit similar to said first orbital unit and mounted on said first mounted unit in the same manner said first orbital unit is mounted on said hollow support column and drive shaft means in vertical alignment therewith to orbit at least one additional body about said point on the axis of said drive shaft means and interorbital drive means operably disposed intermediate said additional orbital unit and said additional body to move said additional orbital body in a trajectory between said first orbital body and said satellite orbital body.

11. A space motion simulator system as set forth in a claim 10 further comprising a transparent oblate spheroid secured to the upper surface of said base means and encompassing the entire orbital path of said first orbital body, said spheroid being provided with markings to indicate the orbital plane of said first orbital body and to enable calculations of relative distances, positions and velocities and transparent globe means mounted concentric to and spaced outwardly of said orbital body and said satellite, said transparent globe means being marked with parallel lines of right ascension and declination corresponding with parallel lines of latitude and longitude on said orbital body.

References Cited

UNITED STATES PATENTS

| | | | |
|---|---|---|---|
| 583,540 | 6/1897 | McDonald | 35—45 |
| 749,508 | 1/1904 | Wesson | 35—45 |
| 1,770,820 | 7/1930 | Tomasevich | 35—45 |
| 2,532,402 | 12/1950 | Herbold | 35—46 X |
| 2,985,969 | 5/1961 | Farquhar | 35—47 |
| 3,089,259 | 5/1963 | Miller | 35—45 |
| 3,251,599 | 5/1966 | Markel | 35—46 X |
| 3,287,832 | 11/1966 | Baerg | 35—47 |
| 3,303,582 | 2/1947 | Farquhar | 35—47 |
| 892,835 | 7/1908 | Hurst | 35—45 |
| 2,795,958 | 6/1957 | Frank | 74—16 |
| 2,890,892 | 6/1959 | Strehlow | 74—606 X |
| 2,939,330 | 6/1960 | Margetts | 74—606 X |
| 3,029,528 | 4/1962 | Verson | 35—45 |
| 3,286,374 | 11/1966 | Baynes | 35—45 |

FOREIGN PATENTS

| | | |
|---|---|---|
| 147,845 | 11/1962 | U.S.S.R. |
| 555,602 | 3/1957 | Belgium. |

JEROME SCHNALL, Primary Examiner

U.S. Cl. X.R.

74—86